United States Patent [19]

Kitamura

[11] 3,758,813

[45] Sept. 11, 1973

[54] VERTICAL DEFLECTION SYSTEM

[75] Inventor: Yoshinori Kitamura, Osaka, Japan

[73] Assignee: Matsushita Electric Industrial Co., Ltd., Osaka, Japan

[22] Filed: Dec. 10, 1970

[21] Appl. No.: 96,760

[30] Foreign Application Priority Data

Dec. 19, 1969 Japan .............................. 44/102710

[52] U.S. Cl. .............................................. 315/27 TD

[51] Int. Cl. ............................................. H01j 29/70

[58] Field of Search ..................... 315/27 TD, 28, 29

[56] References Cited

UNITED STATES PATENTS 3,434,004 3/1969 Smeulers et al. ............... 315/27 TD 3,229,151 1/1966 Attwood ......................... 315/27 TD

*Primary Examiner*—Carl D. Quarforth

*Assistant Examiner*—J. M. Potenza

*Attorney*—Stevens, Davis, Miller & Mosher

[57] ABSTRACT

A vertical deflection system for television receivers and the like employing a single-ended push-pull circuit in the output stage in which a circuit including an inductance is interposed between a power supply or ground and the base circuit of at least one of the two transistors constituting the single-ended push-pull circuit. The fly-back pulses are applied to the circuit including the inductance for increasing the amount of feedback thereby increasing the conduction rate of the transistor, shortening the fly-back period and improving the rate of utilization of power supply voltage.

7 Claims, 12 Drawing Figures

FIG. 1 PRIOR ART
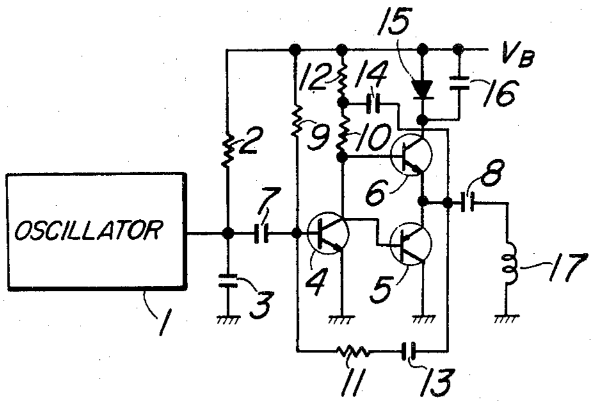
FIG. 2a PRIOR ART
FIG. 2b PRIOR ART
FIG. 2c PRIOR ART
FIG. 2d PRIOR ART
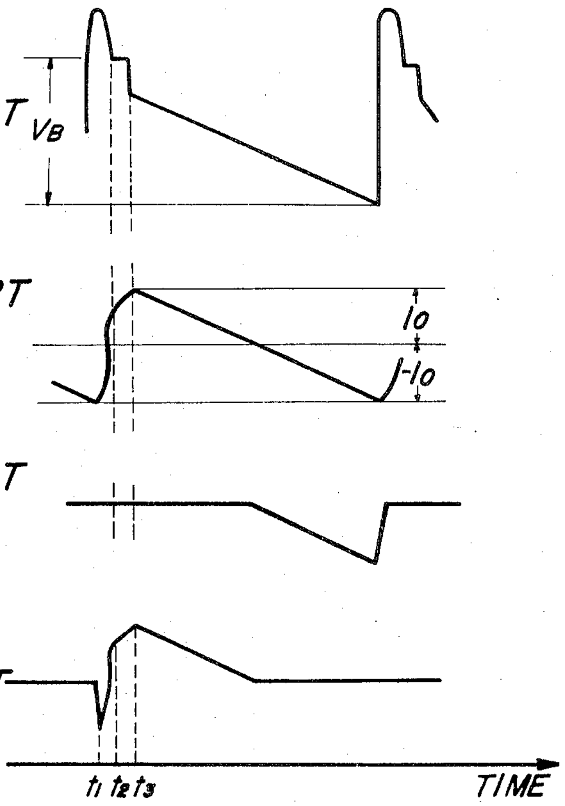
Y. KITAMURA
INVENTOR
BY Stevens, Davis, Miller & Mosher
ATTORNEYS

VERTICAL DEFLECTION SYSTEM

This invention relates to a vertical deflection system for television receivers and the like employing a single-ended push-pull circuit in the output stage.

FIG. 1 shows the structure of parts of a prior art vertical deflection system including a single-ended push-pull circuit employing a PNP and an NPN transistor. Referring to FIG. 1, an oscillator 1 generates a pulse voltage. A CR combination consisting of a resistor 2 and a capacitor 3 generates a saw-tooth voltage in response to the application of the pulse voltage generated by the oscillator 1. The saw-tooth voltage is amplified by a transistor 4 to drive two transistors 5 and 6 which are complementary to each other. The system includes d.c. blocking capacitors 7 and 8, a bias resistor 9 for the transistor 4, a load resistor 10 for the transistor 4, feedback resistors 11 and 12, and feedback capacitors 13 and 14. A diode 15 is provided to protect the transistor 6 from breakdown, and a capacitor 16 constitutes a resonance circuit together with a deflecting coil 17. FIGS. 2*a*, 2*b*, 2*c* and 2*d* show a voltage waveform appearing across the deflecting coil 17, a current waveform flowing through the deflecting coil 17, a current waveform of the output from the transistor 5, and a current waveform of the output from the transistor 6, respectively.

When the current flowing through the deflecting coil 17 varies in a manner as shown in FIG. 2*b* at time $t_1$, a fly-back pulse voltage as shown in FIG. 2*a* appears across the deflecting coil 17 so that a positive potential appears at the base of the transistor 6 to urge the transistor 6 to conduct. The diode 15 is cut off and the fly-back pulse voltage becomes higher than the power supply voltage $V_B$. Current flows through the capacitor 16 and the output from the transistor 6 has a current waveform as shown in FIG. 2*d*. However, due to the fact that the transistor 5 is not cut off at time $t_1$ and the impedance of the transistor 6 in the conducting state is high, the rate of utilization of the resonance current is quite low and the resonance current terminates at time $t_2$. The transistor 6 remains in the conducting state until current $I_o$ flows through the deflecting coil 17 and the current increases up to time $t_3$. This results in a long fly-back period ranging from time $t_1$ to $t_3$. However, it is undesirable to have too much current flowing through the deflecting coil 17 because there is an upper limit in the fly-back period. In other words, it is impossible to limit the fly-back period to a predetermined value unless the saw-tooth voltage between the terminals of the deflecting coil 17 is limited to a small value compared with the power supply voltage.

With a view to eliminating this defect, it is an object of the present invention to shorten the fly-back period and improve the rate of utilization of the power supply voltage.

Another object of the present invention is to provide a vertical deflection system whose output stage includes a single-ended push-pull circuit constituted by two transistors adapted for class "B" amplification.

A further object of the present invention is to provide a vertical deflection system whose output stage includes a single-ended push-pull circuit constituted by two transistors adapted for class "A" amplification.

A yet further object of the present invention is to provide a vertical deflection system employing a transformer whose primary winding is connected to the base circuit of transistors constituting a single-ended push-pull circuit and whose secondary winding is connected to the collector circuit of one of the transistors so as to improve more effectively the rate of utilization of the power supply voltage.

The above and other objects, features and advantages of the present invention will be apparent from the following detailed description of preferred embodiments thereof taken in conjunction with the accompanying drawings, in which:

FIG. 1 is a connection diagram showing a prior art vertical deflection system;

FIGS. 2*a* to 2*d* show signal waveforms appearing at various parts in FIG. 1;

Figure 3:
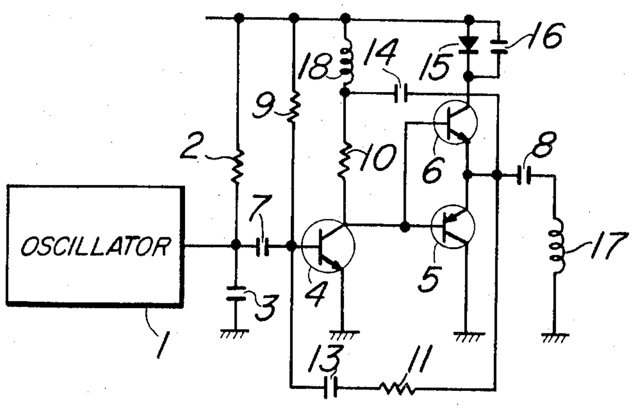
FIG. 3 is a connection diagram showing an embodiment of the present invention.

Referring to FIG. 3, means and circuit elements designated by the reference numerals 1 to 11 and 13 to 17 are similar to those shown in FIG. 1 and operate in the same way. The system shown in FIG. 3 differs from the system shown in FIG. 1 in that the resistor 12 in FIG. 1 is replaced by an inductance 18. The inductance 18, has a low impedance during the sweep period but its impedance is high with respect to the pulse appearing across a deflecting coil 17 during the fly-back period. As previously described, it is possible to improve the rate of utilization of the power supply voltage without widening the fly-back period by abruptly cutting off a transistor 5 during the fly-back period and lowering the impedance of a transistor 6 in the reverse conducting state. To this end, the pulse appearing across the deflecting coil 17 may be fed back to the base circuit of the transistors 5 and 6. Due to the fact that this embodiment employs an inductance in place of the resistor 12 used in the system shown in FIG. 1, a sufficient amount of feedback can be obtained without varying the bias voltage at the output of a transistor 4. Further, because of the fact that saw-tooth current flows through the inductance 18 during the sweep period, a pulse voltage appears across the inductance 18 itself during the fly-back period, and this pulse voltage is superposed on the fly-back pulse voltage fed back from the deflecting coil 17 to cut off the transistor 5 more abruptly and lower the impedance of the transistor 6 in the conducting state. The result of an experiment based on such a method proved that the fly-back period could be shortened from 2 ms to 700 $\mu$s.

Figure 4:
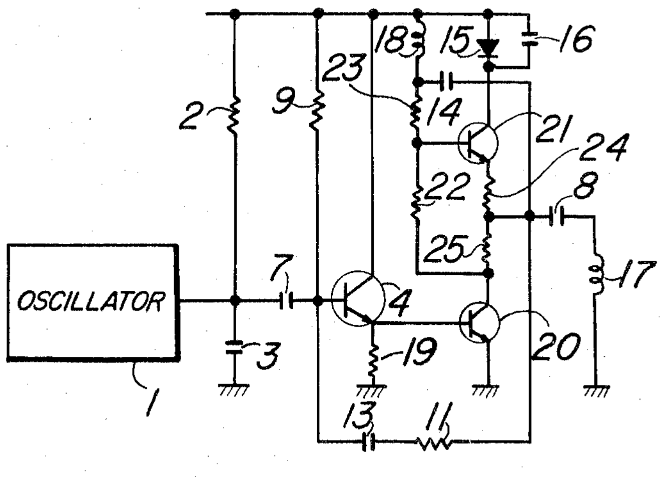
FIG. 4 is a connection diagram showing another embodiment of the present invention.

A system shown in FIG. 4 employs a single-ended push-pull circuit adapted for class "A" amplification, and means and circuit elements designated by the reference numerals 1 to 4, 7 to 9, 11, and 13 to 18 are similar to those shown in FIG. 3 and operate in the same way. The system shown in FIG. 4 further includes an emitter resistor 19 for a transistor 4, a transistor 20 for amplifying the output from the transistor 4, a transistor 21 to which the output from the transistor 20 is applied through a resistor 22, a bias resistor 23, and load resistors 24 and 25 for the transistor 20.

The system shown in FIG. 4 is similar to the system shown in FIG. 3 in that the pulse appearing across a deflecting coil 17 is fed back to the base of the transistor 21 to improve the conduction rate of the transistor 21. In this case too, an inductance 18 ensures a large amount of feedback and thus the fly-back period can be shortened.

Figure 5:
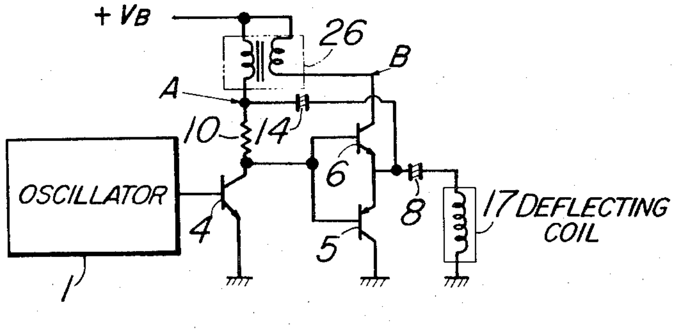
FIG. 5 is a connection diagram showing still another embodiment of the present invention.

A system shown in FIG. 5 is a partial modification of the system shown in FIG. 3 and is intended to further improve the rate of utilization of the power supply voltage. In FIG. 5, means and circuit elements designated by the reference numerals 1, 4, 5, 6, 8, 10, 14 and 17 are similar to those shown in FIG. 3 and operate in the same way. The system shown in FIG. 5 includes a transformer 26 having a primary and a secondary winding wound in the same polarity. The primary winding of this transformer 26 has a high impedance with respect to the fly-back pulse but its impedance is low with respect to the signal appearing during the sweep period.

Figure 6:
FIG. 6 shows a signal waveform appearing at a junction point in FIG. 5.

In operation, the signal generated by an oscillator 1 is amplified by transistors 4, 5 and 6 so that sweep current flows through a deflecting coil 17 for carrying out the sweep. During the fly-back period, a fly-back pulse appears across the deflecting coil 17. Since the primary winding of the transformer 26 has a high impedance with respect to this fly-back pulse, the fly-back pulse is sufficiently fed back through a capacitor 14 so that the transistor 6 conducts. More precisely, an output having a waveform as shown in FIG. 6 appears at the junction point A between a load resistor 10 and the primary winding of the transformer 26 in FIG. 5. Therefore, a signal having a polarity the same as that of the waveform shown in FIG. 6 appears at the junction point B between the secondary winding of the transformer 26 and the transistor 6. The fly-back pulse thus fed back to the base of the transistor 6 increases the base potential of the transistor 6 which is therefore urged to conduct, and the impedance between the collector and emitter of the transistor 6 is reduced to reduce the damping resistance component of the resonance circuit The fly-back pulse appearing across the secondary winding of the transformer 26 is superposed on the power supply voltage, and thus the pulse appearing across the load is not clipped by the power supply voltage. Therefore, the pulse width is not widened. voltage between the terminals of the deflecting coil 17 to the power supply voltage is increased to increase the rate of utilization of the power supply voltage thereby improving the efficiency.

Figure 7:
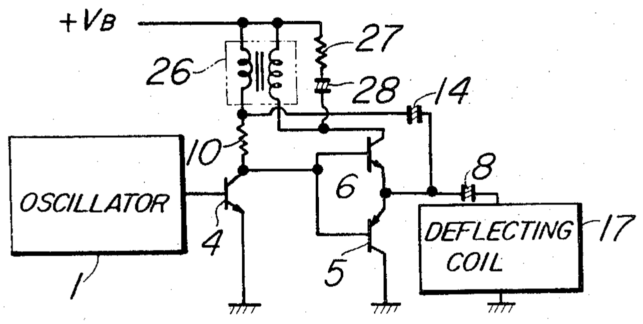
FIG. 7 is a connection diagram illustrating a further embodiment of the present invention.
Figure 8:
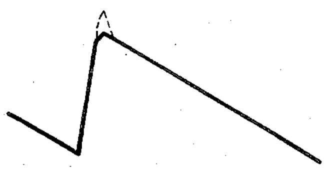
FIG. 8 shows a signal waveform appearing in FIG. 7.

The system shown in FIG. 7 is generally similar to the system shown in FIG. 5 except that a series circuit consisting of a damping resistor 27 and a resonance capacitor 28 is connected in parallel with the secondary winding of the transformer 26. Therefore, the operation of the system shown in FIG. 7 is substantially similar to that of the system shown in FIG. 5 and a deflecting current having a waveform as shown in FIG. 8 flows through a deflecting coil 17. The dotted line in FIG. 8 represents the case in which the resistance of the damping resistor 27 is zero, and it will be seen that the resistance of the damping resistor 27 may be suitably selected for further improving the fly-back period.

Figure 9:
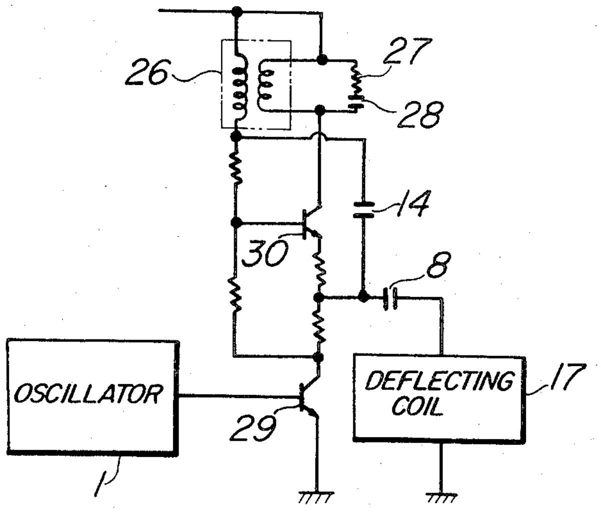
FIG. 9 is a connection diagram depicting a still further embodiment of the present invention.

A system shown in FIG. 9 includes a single-ended push-pull circuit adapted for class "A" amplification. In FIG. 9, a feedback capacitor 14 and a transformer 26 are provided as in the embodiment shown in FIG. 7. The output from an oscillator 1 is amplified by a transistor 29 and the amplified signal is applied to the base of a transistor 30 to drive a deflecting coil 17. Means and circuit elements designated by the same reference numerals as those used in FIG. 7 operate in the same way.

What is claimed is:

1. A vertical deflection system comprising a single-ended push-pull circuit having a load including a deflecting coil connected to its output terminal, a circuit including an inductance disposed between a power supply or ground and the base of one of the two transistors constituting said single-ended push-pull circuit, said inductance having a high impedance with respect to a fly-back pulse, and a feedback circuit for applying the fly-back pulse appearing across said load to a connection point between said inductance and said base, whereby the other transistor is urged off with the initiation of the fly-back period and the impedance of said one transistor is minimized to accelerate discharge of energy stored in said coil for shortening said period.

2. A vertical deflection system as claimed in claim 1, in which said circuit including said inductance is a series circuit consisting of said inductance and a resistor, and the voltage appearing across said load is applied through a capacitor to the junction point between said inductance and said resistor.

3. A vertical deflection system as claimed in claim 1, in which the two transistors constituting said single-ended push-pull circuit are a set of transistors complementary to each other and have their bases connected to a common junction point, and the voltage appearing across said load is applied to said junction point through said feedback circuit and said circuit including said inductance.

4. A vertical deflection system as claimed in claim 2, in which one of the two transistors constituting said single-ended push-pull circuit is triggered by the output signal delivered from the other transistor after the class "A" amplification thereby, and the voltage appearing across said load is fed back solely to the base of the former transistor through said feedback circuit and said circuit including said inductance.

5. A vertical deflection system as claimed in claim 1, in which a transformer having a primary and secondary winding wound in the same polarity is provided so that the primary winding of said transformer serves as said inductance, and the secondary winding of said transformer is connected to the collector circuit of one of the two transistors.

6. A vertical deflection system as claimed in claim 5, in which said primary winding is connected in series with a resistor, and the voltage appearing across said load is applied through a capacitor to the junction point between said primary winding and said resistor.

7. A vertical deflection system comprising a source of a control signal, a single-ended push-pull circuit having two transistors with the base of one of said transistors connected to said source, a deflection coil circuit connected to one output terminal of said push-pull circuit, reactance means for producing resonance, connected between a power supply and the collector of said one transistor, inductance means connected between the base of said one transistor and said power supply or ground, and feedback means for applying a fly-back pulse of the deflection coil to said base, said inductance means presenting a high impedance to the fly-back pulse whereby the other transistor is urged off with the initiation of the fly-back period and the impedance of said one transistor is minimized to accelerate discharge of energy stored in said coil for shortening said period.

* * * * *